United States Patent
Zhao

(10) Patent No.: US 12,471,121 B2
(45) Date of Patent: Nov. 11, 2025

(54) SIDELINK COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 414 days.

(21) Appl. No.: 18/076,246

(22) Filed: Dec. 6, 2022

(65) Prior Publication Data

US 2023/0105567 A1 Apr. 6, 2023

Related U.S. Application Data

(63) Continuation of application No. PCT/CN2020/095977, filed on Jun. 12, 2020.

(51) Int. Cl.
*H04W 72/40* (2023.01)
*H04W 72/044* (2023.01)

(52) U.S. Cl.
CPC ......... *H04W 72/40* (2023.01); *H04W 72/044* (2013.01)

(58) Field of Classification Search
CPC ........... H04L 27/2602; H04L 27/26025; H04L 27/2646; H04L 5/0044; H04L 5/0053;
(Continued)

(56) References Cited

U.S. PATENT DOCUMENTS

2016/0112172 A1* 4/2016 Seo .................. H04L 1/0072
370/329
2018/0368090 A1* 12/2018 Kadambar ............ H04W 8/005
(Continued)

FOREIGN PATENT DOCUMENTS

CN 108605330 A 9/2018
CN 110166198 A 8/2019
(Continued)

OTHER PUBLICATIONS

Guangdong OPPO Mobile Telecommunications Corp. Ltd., EP20940395.5, Extended European Search Report, Jun. 15, 2023, 11 pgs.
(Continued)

*Primary Examiner* — Awet Haile
(74) *Attorney, Agent, or Firm* — Morgan, Lewis & Bockius LLP

(57) ABSTRACT

The present application relates to a sidelink communication method and a terminal device. The sidelink communication method comprises: a sidelink signal sent by a sending end TX occupying interlace resources, wherein one interlace resource comprises a plurality of physical resource blocks (PRBs) with specific intervals on a frequency domain; and a frequency domain bandwidth occupied by one interlace resource is not less than a specific proportion of a channel bandwidth. A sidelink signal sent in the embodiments of the present application occupies the interlace resources, such that the sidelink signal sent by the sending end occupies a certain channel bandwidth on the frequency domain to prevent devices, which work on the same unlicensed frequency band, from performing channel listening on the current time-frequency resource, thereby preventing a plurality of devices from sending sidelink signals on the same
(Continued)

time-frequency resource, and reducing the interference of sidelink communication.

20 Claims, 7 Drawing Sheets

(58) Field of Classification Search
CPC .................. H04W 72/044; H04W 72/0453; H04W 72/40
See application file for complete search history.

(56) References Cited

U.S. PATENT DOCUMENTS

| | | | |
|---|---|---|---|
| 2020/0146000 A1 | 5/2020 | Shin et al. | |
| 2021/0091901 A1* | 3/2021 | Sun | H04W 72/1263 |
| 2021/0092783 A1* | 3/2021 | Sun | H04W 74/0875 |
| 2023/0354311 A1* | 11/2023 | Xue | H04L 5/0044 |

FOREIGN PATENT DOCUMENTS

| | | |
|---|---|---|
| CN | 110178389 A | 8/2019 |
| CN | 110958098 A | 4/2020 |
| CN | 111034309 A | 4/2020 |
| WO | WO2020/033704 A1 | 2/2020 |
| WO | WO2020/067342 A1 | 4/2020 |
| WO | WO2021/248502 A1 | 12/2021 |

OTHER PUBLICATIONS

Guangdong OPPO Mobile Telecommunications Corp. Ltd., International Search Report and Written Opinion, PCT/CN2020/095977, Mar. 10, 2021, 12 pgs.

Qualcomm Incorporated, Considerations on Physical Layer aspects of NR V2X, 3GPP TSG RAN WG1 Meeting #98bis, R1-1912944, Reno, USA, Nov. 14-20, 2019, 13 pgs.

Guangdong OPPO Mobile Telecommunications Corp. Ltd., EP20940395.5, First Office Action, Mar. 27, 2025, 6 pgs.

* cited by examiner

Fig. 4

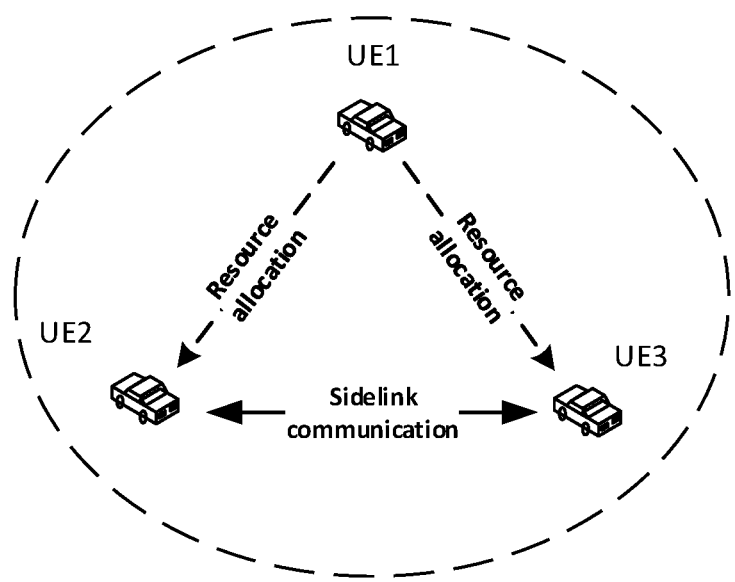

| Sending, by a Transmitter (TX), a sidelink signal occupying an interleaved resource, one interleaved resource includes a plurality of Physical Resource Blocks (PRBs) with a specific interval in frequency domain, and a frequency domain bandwidth occupied by one interleaved resource is not less than a specific proportion of a channel bandwidth | S210 |

| Sending, by a Transmitter (TX), a PSCCH and a PSSCH multiplexed by means of time division within one slot, the PSCCH occupies at least one PRB, and a frequency domain bandwidth occupied by an OFDM symbol where the PSCCH is located is controlled by one or more TXs to be not less than a specific proportion of a channel bandwidth | S310 |

Fig. 7

SIDELINK COMMUNICATION METHOD AND TERMINAL DEVICE

CROSS-REFERENCE TO RELATED APPLICATION

This application is a continuation application of PCT Patent Application No. PCT/CN2020/095977, entitled "SIDELINK COMMUNICATION METHOD AND TERMINAL DEVICE" filed on Jun. 12, 2020, which is incorporated herein by reference in its entirety.

TECHNICAL FIELD

The present disclosure relates to the field of communications, and more particularly, to a sidelink communication method and a terminal device.

BACKGROUND

Different from a traditional cellular system in which communication data is received or sent through a base station, sidelink communication has higher spectral efficiency and lower transmission delay. When the sidelink communication operates in an unlicensed frequency band, a sidelink signal sent by a terminal needs to occupy a certain channel bandwidth in frequency domain. Otherwise, devices operating in the same unlicensed frequency band may perform channel monitoring on a current time-frequency resource, and may consider that the next time-frequency resource satisfies a resource selection condition. Thus, this leads to a plurality of devices sending signals on the same time-frequency resource, causing serious mutual interferences.

SUMMARY

Embodiments of the present disclosure provide a sidelink communication method and a terminal device, which can reduce interferences in sidelink communication.

Embodiments of the present disclosure provide a sidelink communication method, including: sending, by a Transmitter (TX), a sidelink signal occupying an interleaved resource. One interleaved resource includes a plurality of Physical Resource Blocks (PRBs) with a specific interval in frequency domain. A frequency domain bandwidth occupied by one interleaved resource is not less than a specific proportion of a channel bandwidth.

Embodiments of the present disclosure provide a sidelink communication method, including: sending, by a Transmitter (TX), a PSCCH and a PSSCH multiplexed by means of time division within one slot. The PSCCH occupies at least one PRB. A frequency domain bandwidth occupied by an OFDM symbol where the PSCCH is located is controlled by one or more TXs to be not less than a specific proportion of a channel bandwidth.

Embodiments of the present disclosure provide a terminal device. The terminal device is a Transmitter (TX). The terminal device includes: a sending module, configured to send a sidelink signal occupying an interleaved resource. One interleaved resource includes a plurality of Physical Resource Blocks (PRBs) with a specific interval in frequency domain. A frequency domain bandwidth occupied by one interleaved resource is not less than a specific proportion of a channel bandwidth.

Embodiments of the present disclosure provide a terminal device. The terminal device is a transmitter (TX). The terminal device includes: a sending module, configured to send a PSCCH and a PSSCH. The PSCCH and the PSSCH are multiplexed by means of time division within one slot. The PSCCH occupies at least one PRB. A frequency domain bandwidth occupied by an OFDM symbol where the PSCCH is located is controlled by one or more TXs to be not less than a specific proportion of a channel bandwidth.

Embodiments of the present disclosure provide a terminal device, including a processor and a memory. The memory is configured to store a computer program. The processor is configured to call and run the computer program stored in the memory, so that the terminal device is caused to perform the sidelink communication method as described above.

Embodiments of the present disclosure provide a network device, including a processor and a memory. The memory is configured to store a computer program. The processor is configured to call and run the computer program stored in the memory, so that the network device is caused to perform the sidelink communication method as described above.

Embodiments of the present disclosure provide a chip for implementing the sidelink communication method as described above.

Specifically, the chip includes: a processor, configured to call and run a computer program from a memory, so that a device installed with the chip performs the sidelink communication method as described above.

Embodiments of the present disclosure provide a computer-readable storage medium, configured to store a computer program. The computer program, when run by a device, causes the device to perform the sidelink communication method as described above.

Embodiments of the present disclosure provide a computer program product, including computer program instructions. The computer program instructions cause a computer to perform the sidelink communication method as described above.

Embodiments of the present disclosure provide a computer program, which, when run on a computer, causes the computer to perform the sidelink communication method as described above.

In embodiments of the present disclosure, the sidelink signal sent by the transmitter occupies a certain channel bandwidth in frequency domain to prevent devices operating on the same unlicensed frequency band from performing channel monitoring on a current time-frequency resource. Thereby, a plurality of devices is prevented from sending sidelink signals on the same time-frequency resource, and interferences of the sidelink communication are reduced.

BRIEF DESCRIPTION OF THE DRAWINGS

FIG. 4 is a schematic diagram of sidelink communication without a central control node.

FIG. 5 is a schematic diagram of sidelink communication with a central control node.

FIG. 6 is a schematic flowchart of a sidelink communication method according to an embodiment of the present disclosure.

FIG. 7 is a schematic flowchart of a sidelink communication method according to another embodiment of the present disclosure.

DETAILED DESCRIPTION

Figure 1:
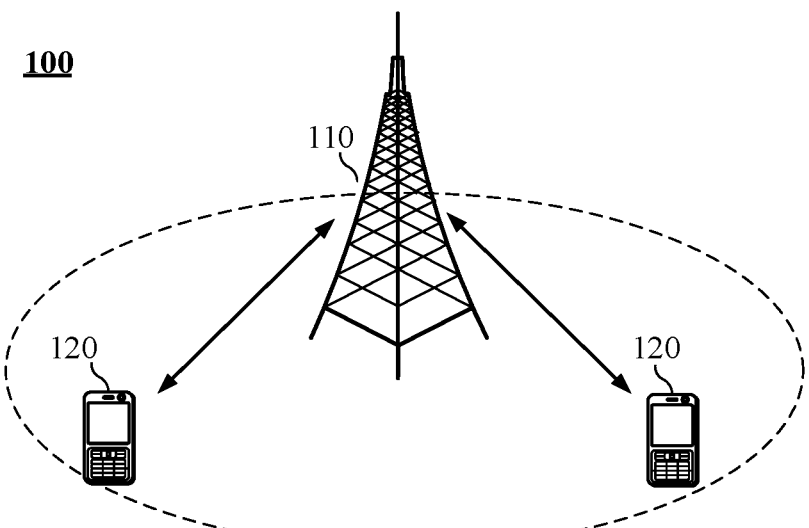
FIG. 1 is a schematic diagram of an application scenario according to an embodiment of the present disclosure.

The technical solutions in embodiments of the present disclosure will be described below with reference to the accompanying drawings in embodiments of the present disclosure.

The technical solutions in embodiments of the present disclosure are applicable to various communication systems, for example, a global system of mobile communication (GSM) system, a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a Non-Terrestrial Network (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections and therefore is easy to implement. However, with development of communication technology, a mobile communication system will not only support conventional communication, but also support, for example, device to device (D2D) communication, machine to machine (M2M) communication, machine type communication (MTC), vehicle to vehicle (V2V) communication, or vehicle to everything (V2X) communication, etc. Embodiments of the present disclosure can also be applied to these communication systems.

In some embodiments, a communication system in embodiments of the present disclosure may be applied to a carrier aggregation (CA) scenario, a dual connectivity (DC) scenario, or a standalone (SA) network deployment scenario.

In some embodiments, the communication system in embodiments of the present disclosure may be applied to an unlicensed spectrum, and the unlicensed spectrum may also be considered as a shared spectrum. Alternatively, the communication system in embodiments of the present disclosure may also be applied to a licensed spectrum, and the licensed spectrum may also be considered a non-shared spectrum.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc.

The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA) device, a handheld device or a computing device with a wireless communication function, or other processing devices connected to a wireless modem, a vehicle-mounted device, a wearable device, or a terminal device in a next generation communication system, such as a terminal device in an NR network or a terminal device in a future evolved Public Land Mobile Network (PLMN).

In embodiments of the present disclosure, the terminal device may be deployed on land, including indoor or outdoor, handheld, wearable, or vehicle-mounted. The terminal device may also be deployed on a water surface (such as on a ship). The terminal device may also be deployed in air (for example, on an aircraft, a balloon, a satellite, etc.).

In embodiments of the present disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, a wireless terminal device in smart home.

By way of example but not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include a device with full features, a large size, and full or partial functions which may be implemented without relying on a smart phone, for example, a smart watch or smart glasses, as well as a device that is only focused on a certain application function and needs to be cooperated with other devices such as a smart phone, for example, a smart bracelet and a smart jewelry for various physical sign monitoring.

In embodiments of the present disclosure, the network device may be a device for communicating with a mobile device, or may be an Access Point (AP) in WLAN, or a Base Transceiver Station (BTS) in GSM or CDMA, or may be a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, a network device in the future evolved PLMN network, or a network device in the NTN network.

As an example but not a limitation, in embodiments of the present disclosure, the network device may have a mobile feature. For example, the network device may be a mobile device. In some embodiments, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. In some embodiments, the network device may also be a base station provided on land or in a water area.

In embodiments of the present disclosure, the network device provides services for a cell, and a terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

FIG. 1 exemplarily shows a communication system 100. The communication system includes one network device 110 and two terminal devices 120. In some embodiments, the communication system 100 may include a plurality of network devices 110, and the coverage of each network device 110 may include other numbers of terminal devices 120, which is not limited by embodiments of the present disclosure.

In some embodiments, the communication system may further include other network entities, such as a Mobility Management Entity (MME), and an Access and Mobility Management Function (AMF), which are not limited by embodiments of the present disclosure.

The network device may also include an access network device and a core network device. That is, the wireless communication system further includes a plurality of core networks for communicating with the access network device. The access network device may be an Evolutional Node B (eNB or e-NodeB for short), a macro base station, a micro base station (also referred to as a "small base station"), a pico base station, an Access Point (AP), or a Transmission Point (TP), or a new generation Node B (gNodeB), etc. in a Long-Term Evolution (LTE) system, a next-generation (mobile communication system) (New Radio (NR) system), or an Authorized Auxiliary Access Long-Term Evolution (LAA-LTE) system.

It should be understood that, a device having a communication function in the network or system of embodiments of the present disclosure may be referred to as a communication device. Taking the communication system shown in FIG. 1 as an example, the communication device may include the network device and the terminal device with communication functions. The network device and the terminal device may be specific devices described in embodiments of the present disclosure, which will not be repeated here. The communication device may also include other devices in the communication system, for example, other network entities such as the network controller and the mobility management entity, which are not limited by embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

It should be understood that the "indication" mentioned in embodiments of the present disclosure may be direct indication or indirect indication, and may also represent there is an association relationship. For example, if A indicates B, it may mean that A directly indicates B. For example, B can be obtained through A. Also, it may mean that A indirectly indicates B. For example, A indicates C, and B can be obtained through C. Besides, it may also mean that there is an association relationship between A and B.

In the description of embodiments of the present disclosure, the term "corresponding" may mean that there is a direct or indirect correspondence between two items, or may mean that there is an association relationship between the two items, or may also mean that there is an indicating-and-indicated relationship or a configuring-and-configured relationship between the two items.

In order to facilitate understanding of the technical solutions in embodiments of the present disclosure, the related art about embodiments of the present disclosure is described below. The following related art as optional solutions can be arbitrarily combined with the technical solutions in embodiments of the present disclosure, which all belong to the protection scope of embodiments of the present disclosure.

A multiplexing option for a Physical Sidelink Control Channel (PSCCH) and a Physical Sidelink Share Channel (PSSCH) in NR Vehicle to Everything (V2X) is first introduced.

Figure 2:
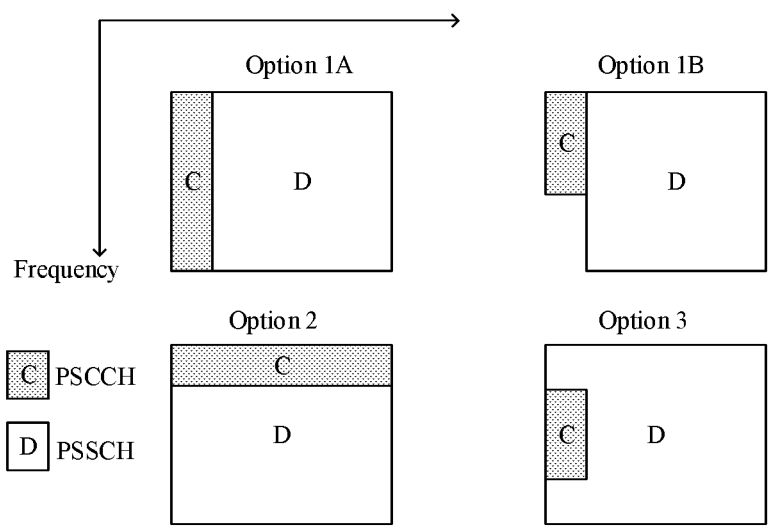
FIG. 2 is a schematic diagram of a multiplexing option for a PSCCH and a PSSCH in NR V2X.

As shown in FIG. 2, the following multiplexing options for the PSCCH and the PSSCH have been considered in the NR V2X.

Option 1A

In this option, the PSCCH and the PSSCH occupy non-overlapping Orthogonal Frequency Division Multiplexing (OFDM) symbols in time domain, and occupy the same Physical Resource Block (PRB) in frequency domain. That is, the PSCCH and the PSSCH are completely multiplexed by time division. This option facilitates to reduce a decoding delay of the PSSCH, as the PSCCH can be decoded before the PSSCH starts. However, since the PSCCH and the PSSCH occupy the same number of PRBs in frequency domain, the number of PRBs occupied by the PSCCH in frequency domain will change with the number of PRBs occupied by the PSSCH. Since both of traffic load and code rate may change in a large range in the NR-V2X, a dynamic range of the number of PRBs occupied by the PSSCH may be large. Moreover, the PSSCH can start from any sub-channel. Thus, a receiving UE needs to blindly detect the PSCCH at a starting point of each sub-channel.

Option 1B

Like Option 1A, the PSCCH and the PSSCH still occupy non-overlapping OFDM symbols in this Option 1B. Accordingly, Option 1B and Option 1A have the same performance in terms of delay. However, unlike Option 1A, the number of PRBs occupied by the PSCCH does not change with a size in frequency domain of the PSSCH in Option 1B. Thus, the receiving UE can be avoided from performing PSCCH blind detection. However, since the number of PRBs occupied by the PSSCH is often more than that of the PSCCH, in this case, a resource on the OFDM symbol where the PSCCH is located will be wasted.

Option 2

Option 2 and the LTE-V2X use the same multiplexing option for the PSCCH and the PSSCH. That is, the PSCCH and the PSSCH occupy non-overlapping frequency domain resources, but occupy the same OFDM symbol. In this option, the PSCCH occupies all OFDM symbols in the entire slot. Accordingly, an option similar to that in the LTE-V2X can be used to increase a power spectral density of the PSCCH by 3 dB relative to the PSSCH, thereby increasing the reliability of the PSCCH. However, in this option, the receiving UE needs to start decoding the PSCCH after a slot ends, which eventually leads to a higher PSSCH decoding delay than those in Option 1A and Option 1B.

Option 3

In this option, the PSCCH and a part of the PSSCH are sent on non-overlapping frequency domain resources in the same OFDM symbol, while the PSCCH and the remaining part of the PSSCH are sent on non-overlapping OFDM symbols. Option 3 has an advantage of low delay as Option 1 and Option 1A. However, since the size in frequency domain of the PSCCH is constant, the PSCCH blind detection can be avoided. In addition, on the OFDM symbol where the PSCCH is located, if the number of PRBs occupied by the PSCCH is less than that of the PSSCH, the remaining PRBs can still be used for sending the PSSCH, so as to avoid the problem of resource waste in Option 1A.

Figure 3:
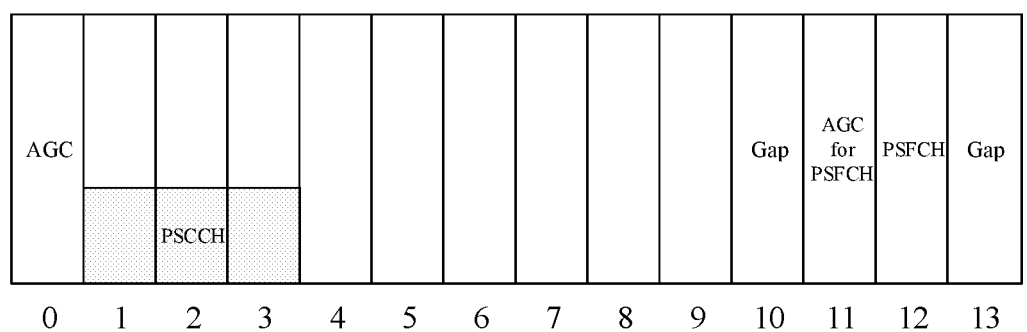
FIG. 3 is a schematic diagram of a NR-V2X frame structure in which one slot includes a plurality of OFDM symbols.

As shown in FIG. 3, it is a schematic diagram of a slot structure adopted in the NR-V2X. In FIG. 3, all OFDM symbols in one slot can be used for sidelink transmission, and a Physical Sidelink Feedback Channel (PSFCH) resource is included in this slot.

For example, in FIG. 3, in one slot, the first OFDM symbol is always used for Automatic Gain Control (AGC). On the AGC symbol, the UE replicates information sent on the second OFDM symbol. The last OFDM symbol remains a guard period with one symbol for the UE to convert from a transmitting/receiving state to a receiving/transmitting state. The PSCCH and the PSSCH are multiplexed according to the above-mentioned Option 3, and the PSCCH can occupy two or three OFDM symbols. In frequency domain, if the number of PRBs occupied by the PSCCH is less than that of the PSSCH, the PSCCH can be frequency-division multiplexed with the PSSCH on the OFDM symbol where the PSCCH is located.

In the NR-V2X, a PSFCH resource is configured periodically. If the PSFCH resource exists within one slot, the PSFCH is located in the penultimate OFDM symbol within the slot. Since a received power of the UE may change on an OFDM symbol where the PSFCH is located, the third-to-last symbol in the slot where the PSFCH is located will also be used for sending the PSFCH, so as to assist the receiving UE to perform AGC adjustment (AGC for PSFCH). Furthermore, the UE transmitting the PSSCH and the UE transmitting the PSFCH may be different. Therefore, before two PSFCH symbols, an additional symbol (the Gap as shown in FIG. 3, which may be called the guard period) needs to be added for the receiving/transmitting conversion by the UE.

Vehicle To Everything (V2X) belongs to a sidelink communication scenario. An Internet of vehicles system adopts the way of a Device to Device communication, and two transmission modes are defined in Third Generation Partnership Project (3GPP), including a first mode and a second mode.

In the first mode, a transmission resource of the terminal is allocated by the base station, and the terminal transmits data on the sidelink according to the resource allocated by the base station. Besides, the base station can allocate a resource for a single transmission to the terminal, or can allocate a semi-static transmission resource to the terminal. In the second mode, the terminal selects a resource from a resource pool for data transmission. The second mode can be further divided into a scenario without a central control node and a scenario with a central control node according to whether a central control node of the non-base station type exists.

The scenario without the central control node is shown in FIG. 4. A sidelink communication resource between a Transmitter (TX) and a Receiver (RX) is autonomously selected by the TX from a specific resource pool. For the sidelink communication with the central control node, as shown in FIG. 5, a plurality of terminals form a communication group, and the communication group has a central control node that may also be called a Cluster Header (CH). Other terminals in the communication group are called Cluster Members (CMs). The central control node has at least one of the following functions: being responsible for establishing a communication group; being responsible for joining and leaving of a group member; performing resource coordination; allocating a sidelink transmission resource for other terminals; receiving sidelink feedback information from other terminals; performing resource coordination with other communication groups; and the like. In the present disclosure, a transmission from the CH to the CM is called a downlink transmission, and a transmission from the CM to the CH is called an uplink transmission.

When the sidelink communication operates in an unlicensed frequency band, the sidelink signal sent by the terminal needs to occupy more than a specific proportion, for example 80%, of a channel bandwidth in frequency domain. Otherwise, devices operating on the same unlicensed frequency band will likely perform channel monitoring on the current time-frequency resource, and consider that the next time-frequency resource meets a resource selection condition. This will eventually lead to a plurality of devices sending signals on the same time-frequency resource, thus causing serious mutual interferences. However, if the PSCCH and the PSSCH occupy a plurality of consecutive PRBs in frequency domain, it does not need to be guaranteed that the occupied frequency domain bandwidth is always greater than the specific proportion, for example 80%, of the channel bandwidth, rendering it impossible for being applied to the sidelink communication on the unlicensed frequency band.

FIG. 6 is a schematic flowchart of a sidelink communication method 200 according to an embodiment of the present disclosure. The method can optionally, but is not limited to, be applied to the system shown in FIG. 1. The method includes at least part of the following contents.

In S210, a sidelink signal is sent by a Transmitter (TX), where the sidelink signal occupies an interleaved resource. One interleaved resource includes a plurality of Physical Resource Blocks (PRBs) with a specific interval in frequency domain, and a frequency domain bandwidth occupied by one interleaved resource is not less than a specific proportion of a channel bandwidth. The specific proportion may be a proportion that ensures other devices cannot perform channel monitoring. For example, the specific proportion may be a certain value from 80% to 100%. In embodiments of the present disclosure, the sidelink signal occupies the interleaved resource, so that the sidelink signal sent by the transmitter occupies a certain channel bandwidth in frequency domain, so as to prevent devices operating on the same unlicensed frequency band from performing channel monitoring on a current time-frequency resource. Thereby, a plurality of devices is prevented from sending sidelink signals on the same time-frequency resource, and interferences of the sidelink communication are reduced.

In some embodiments of the present disclosure, one interleaved resource includes F PRBs with a starting point off and an interval of k PRBs, where $0 \leq f < k$, and F is a maximum integer rendering f+F*k to be not greater than the channel bandwidth W. The starting point being f indicates that an index of the PRB is f. For example, if the starting point is 0, k is 2, and W is 10, then F is 4, and one interleaved resource includes 4 PRBs. A value of F, positions in frequency domain of the F PRBs, and a value of k may be configured by a base station, configured by the CH, pre-configured or defined by a standard.

In some embodiments of the present disclosure, the value of k corresponds to a Sub-Carrier Space (SCS). That is, k has different values for different sub-carrier spaces.

In some embodiments of the present disclosure, the sidelink signal includes a Physical Sidelink Control Channel (PSCCH) and a Physical Sidelink Shared Channel (PSSCH). For example, the PSCCH sent by the TX and the PSSCH scheduled by the PSCCH occupy at least one interlaced resource or at least one PRB of the interlaced resource.

In some embodiments of the present disclosure, N consecutive OFDM symbols starting from an n-th OFDM symbol within one slot are used for the PSCCH. If a Receiver (RX) does not need to perform Automatic Gain Control (AGC), n=0; and otherwise, n=1, where N is a positive integer. A value of N may be configured by the base station, configured by the CH, pre-configured or defined by a standard.

For example, referring to FIG. 3, it is assumed that one slot includes 14 OFDM symbols, i.e., symbols with indexes of 0 to 13. If the RX needs to perform AGC, a symbol with an index of 0 is used for AGC, where n=1. Assuming N=3, OFDM symbols with indexes of 1, 2 and 3 are used for the PSCCH. OFDM symbols with indexes of 4 to 12 are used for PSSCH (assuming that a symbol with the index of 13 is a guard period). If the RX does not need to perform AGC, n=0. Assuming N=3, the OFDM symbols with the indexes of 0, 1 and 2 are used for the PSCCH. The OFDM symbols with the indexes of 3 to 12 are used for the PSSCH (assuming the symbol with the index of 13 is a guard period).

The number of OFDM symbols included in the above-mentioned one slot is only an example but not a limitation. The number of OFDM symbols that can be used for sidelink transmission in one slot may be configured by the base station, configured by the CH, pre-configured or defined by the standard.

In some embodiments of the present disclosure, if the PSCCH is sent starting from an OFDM symbol with an index of 1, an OFDM symbol with an index of 0 is used to send the PSSCH, or used to repeatedly send the same PSCCH as the PSCCH on the OFDM symbol with the index of 1.

For example, in a case where the RX needs to perform AGC, the PSCCH is sent from the OFDM symbol with the index of 1. In this case, redundant information may be sent on the OFDM symbol with the index of 0. For example, the PSCCH or the PSSCH scheduled by the PSCCH may be sent on the OFDM symbol with the index of 0.

In some embodiments of the present disclosure, the PSCCH and the PSSCH are multiplexed by means of time division in the same slot. Multipath signals may be transmitted at different times in the way of time division multiplexing. In a case of time division multiplexing, at least one of the following modes may be included.

In mode 1, the PSCCH occupies at least one interleaved resource.

In some embodiments, in this mode, the PSCCH occupies M1 interleaved resources. If the PSSCH scheduled by the PSCCH is located in a current slot, M1 is the same as the number of interleaved resources occupied by the PSSCH scheduled by the PSCCH. The current slot is a slot where the PSCCH is located, and M1 is a positive integer. For example, in the current slot, the PSSCH scheduled by the PSCCH occupies two interleaved resources, and the two interleaved resources are interleaved resource 0 and interleaved resource 1.

In some embodiments, in this mode, the PSCCH occupies M2 interlaced resources. If the PSCCH does not schedule the PSSCH, or the PSSCH scheduled by the PSCCH is located in a different slot than the PSCCH, M2 has one allowable value or a plurality of optional values in a resource pool, where M2 is a positive integer.

A value of M1 and/or M2 may be configured by the base station, configured by the CH, pre-configured or defined by the standard. For example, if M2 includes the plurality of optional values, the Transmitter may select the value of M2 according to a current channel condition.

In some embodiments, in this mode, OFDM symbols within the slot other than the OFDM symbol used for the PSCCH are used for the PSSCH scheduled by the PSCCH.

In mode 2, the PSCCH occupies at least one PRB of one interlaced resource.

In some embodiments, in this mode, the PSSCH scheduled by the PSCCH occupies PRBs in the interleaved resource other than the PRB occupied by the PSCCH.

In some embodiments of the present disclosure, the PSCCH and the PSSCH are multiplexed by means of frequency division. Multiple signals may be transmitted through different frequency domain resources in the same time period and the same channel in the way of frequency division multiplexing. In the case of frequency division multiplexing, at least one of the following options may be included.

In option 1, the PSCCH occupies at least one interleaved resource within one slot.

In some embodiments, in this option, the PSCCH occupies M3 interleaved resources within one slot, where M3 has one allowable value or a plurality of optional values in a resource pool, and M3 is a positive integer. M3 may be configured by the base station, configured by the CH, pre-configured or defined by the standard.

In option 2, the PSCCH occupies at least one PRB of one interlaced resource within one slot.

In some embodiments of the present disclosure, if the PSSCH scheduled by the PSCCH occupies a plurality of interleaved resources, starting points in frequency domain of the plurality of interleaved resources occupied by the PSSCH are adjacent.

Optionally, in this option, the PSCCH is sent on a specific number of PRBs starting from a first interlaced resource occupied by the PSSCH. The specific number may be configured by the base station, configured by the CH, pre-configured or defined by the standard.

In some embodiments, in this option, the PSCCH occupies first a PRBs of first A interleaved resources occupied by the PSSCH, where A and a are positive integers. A value of A and/or a may be configured by the base station, configured by the CH, pre-configured or defined by the standard. For example, assuming that A is 3 and a is 2, the resource pool includes 10 interleaved resources, and first three interleaved resources occupied by the PSSCH scheduled by the PSCCH are interleaved resource 0, interleaved resource 1 and interleaved resource 2, respectively. The PSCCH may occupy first two PRBs of interleaved resource 0, interleaved resource 1, and interleaved resource 2, while other PRBs of interleaved resource 0, interleaved resource 1 and interleaved resource 2 may be used to transmit the PSSCH.

In option 3, the PSCCH occupies at least one PRB in a resource pool including at least one interleaved resource.

In some embodiments, in this option, the resource pool includes a PSCCH resource set and a PSSCH resource set.

In some embodiments, in this option, the PSCCH resource set includes at least one PSCCH resource, and one PSCCH resource consists of one PRB or a plurality of consecutive PRBs. Exemplarily, a PSCCH resource included in the PSCCH resource set may not be the interleaved resource, and the PSSCH resource set may include a plurality of interleaved resources.

In some embodiments, in this option, the number of interleaved resources in the PSSCH resource set is the same as the number of PSCCH resources in the PSCCH resource set. For example, if the PSCCH resource set includes three PSCCH resources, the PSSCH resource set includes three interleaved resources.

In some embodiments, in this option, a starting point in frequency domain of the PSSCH scheduled by the PSCCH sent on an i-th PSCCH resource in the PSCCH resource set is a starting point of an i-th interlaced resource in the PSCCH resource set, where i is 0 or a positive integer. As such, a position of the PSSCH may be determined by a position of the PSCCH, and does not need to be indicated by an extra bit.

In some embodiments of the present disclosure, the PSCCH is multiplexed with the PSSCH by means of frequency division on part of the OFDM symbols that are available for sidelink communication in one slot.

In some embodiments of the present disclosure, the PSCCH occupies at least one interleaved resource on the part of the OFDM symbols.

In some embodiments of the present disclosure, the PSCCH occupies at least one PRB of one interleaved resource on the part of the OFDM symbols.

In some embodiments of the present disclosure, if the PSCCH and the PSSCH scheduled by the PSCCH are sent in the same slot, frequency domain resources occupied by one TX are the same on a PSCCH symbol and on a symbol where only the PSSCH exists. This helps to avoid the terminal converting frequency domain resources or changing a transmit power spectral density between different OFDM symbols, so as to increase the radio frequency complexity of the terminal. The PSCCH symbol includes a plurality of consecutive OFDM symbols for sending the PSCCH. In the slot, the frequency domain resources occupied by the TX may include a sum of frequency domain resources occupied by the PSCCH and the PSSCH sent by the TX.

In some embodiments of the present disclosure, if S4 interleaved resources are occupied by one TX on the symbol where only the PSSCH exists, the S4 interleaved resources are a superset in frequency domain of M4 interleaved resources used by the TX to send the PSCCH. For example, the M4 interleaved resources for sending the PSCCH include interleaved resource 1 and interleaved resource 2. PRB0 and PRB1 of interleaved resource 1 are used for sending PSCCH. PRB0 and PRB1 of interleaved resource 2 are used for sending PSCCH. The S4 interleaved resources occupied by one TX on the symbol where only the PSSCH exists include interleaved resource 1 and interleaved resource 2, and further include interleaved resources 3 to 10. PRBs on interleaved resource 1 other than PRB0 and PRB1 are used for sending PSSCH. PRBs on interleaved resource 2 other than PRB0 and PRB1 are used for sending PSSCH. All other frequency domain resources are used to send PSSCH. The above S4 interleaved resources include the M4 interleaved resources, so the S4 interleaved resources are the superset of the M4 interleaved resources.

In some embodiments of the present disclosure, the PSSCH scheduled by the PSCCH is sent by the TX on an interlaced resource not used for sending the PSCCH among the S4 interlaced resources on the PSCCH symbol. For example, among the S4 interleaved resources, PRB0 and PRB1 of interleaved resource 1 are used for sending the PSCCH, and PRB0 and PRB1 of interleaved resource 2 are used for sending the PSCCH. Other PRBs are used for sending the PSSCH scheduled by the PSCCH.

In some embodiments of the present disclosure, M4 has one allowable value or a plurality of optional values in the resource pool.

In some embodiments, a value of M4 may be configured by the base station, configured by the CH, pre-configured or defined by the standard.

FIG. 7 is a schematic flowchart of a sidelink communication method 300 according to an embodiment of the present disclosure. The method may optionally, but is not limited to, be applied to the system shown in FIG. 1. The method includes at least part of the following contents. The content in this embodiment that is the same as that described in the foregoing embodiments has the same meaning, and reference may be made to the relevant description of the foregoing embodiments, which is not repeated here.

In S310, a PSCCH and a PSSCH sent by a Transmitter (TX) are multiplexed by means of time division within one slot. The PSCCH occupies at least one PRB. A frequency domain bandwidth occupied by an OFDM symbol where the PSCCH is located is controlled by one or more TXs to be not less than a specific proportion of a channel bandwidth. In embodiments of the present disclosure, one or more TXs control the sidelink signal to occupy a certain channel bandwidth in frequency domain, so as to prevent devices operating on the same unlicensed frequency band from performing channel monitoring on a current time-frequency resource. Thereby, a plurality of devices is prevented from sending sidelink signals on the same time-frequency resource, and interferences of the sidelink communication are reduced.

In some embodiments of the present disclosure, N consecutive OFDM symbols starting from an n-th OFDM symbol within one slot are used for the PSCCH. If a Receiver (RX) does not need to perform Automatic Gain Control (AGC), n=0; and otherwise, n=1, where N is a positive integer. A value of N may be configured by the base station, configured by the CH, pre-configured or defined by the standard.

In some embodiments of the present disclosure, one PSCCH occupies M5 PRBs, where M5 is a positive integer.

In some embodiments of the present disclosure, M5 has one allowable value or a plurality of optional values in a resource pool. In some embodiments, the allowable value or the plurality of optional values of M5 may be configured by the base station, configured by the CH, pre-configured or defined by the standard.

In some embodiments of the present disclosure, if one TX is scheduled by the base station or the CH, the value of M5 adopted by the TX may be dynamically indicated by the base station or the CH.

In some embodiments of the present disclosure, if the TX is a Cluster Header (CH), M5 is selected by the CH.

In some embodiments of the present disclosure, if the TX is the CH, the CH sends padding information to control the frequency domain bandwidth occupied by the OFDM symbol where the PSCCH is located to not be less than the specific proportion of the channel bandwidth. For example, the specific proportion is 80%.

In some embodiments of the present disclosure, if M5 is greater than 1, the M5 PRBs are consecutive or discrete in frequency domain.

In an application scenario, if the sidelink communication operates in the unlicensed frequency band, the number of OFDM symbols available for the sidelink transmission in one slot may be configured by the base station, configured by the CH, pre-configured or defined by the standard, and may be equal to or less than the total number N of OFDM symbols in one slot. Without loss of generality, in the following description, it is assumed that all OFDM symbols in one slot can be used for the sidelink transmission, and there are only the PSCCH and the PSSCH and their demodulation reference signals in the slot. The solution proposed in the present disclosure can still be used in a case where the number of OFDM symbols available for the sidelink transmission in one slot is less than N, or used in a case where other channels or signals exist in the slot, such as a PSFCH. According to the foregoing analysis, when the TX send the PSCCH and the PSSCH on the unlicensed frequency band, it needs to ensure that the occupied bandwidth exceeds the specific proportion, for example 80%, of the channel bandwidth. To this end, the present disclosure proposes the following sending methods for the PSCCH and the PSSCH.

The PSCCH and the PSSCH are multiplexed by means of time division in the same slot. The PSCCH occupies at least one interleaved resource, and is located in first one or more OFDM symbols that can be used for the sidelink communication in one slot.

The PSCCH and the PSSCH are multiplexed by means of frequency division. The PSCCH occupies a specific interleaved resource within one slot, or occupies a specific PRB of one interleaved resource, or occupies a specific PRB in the resource pool.

The PSCCH and the PSSCH are multiplexed with the PSSCH by means of frequency division on part of the OFDM symbols that can be used for the sidelink communication in one slot. On the part of the OFDM symbols, the PSCCH may occupy a specific interleaved resource, a specific PRB of the interleaved resource, or a specific PRB in the resource pool.

The PSCCH and the PSSCH are multiplexed by means of time division in the same slot. The PSCCH occupies one or more PRBs. The one or more TXs ensure that the channel bandwidth occupied by the OFDM symbol where the PSCCH is located is not less than the specific proportion of the channel bandwidth.

In the following, several examples are used to introduce the above sending methods for the PSCCH and the PSSCH, respectively.

Example 1

The PSCCH and the PSSCH are multiplexed by means of time division in the same slot. The PSCCH is located in first one or more OFDM symbols that can be used for the sidelink communication in one slot, and occupies at least one interleaved resource.

Figure 8:
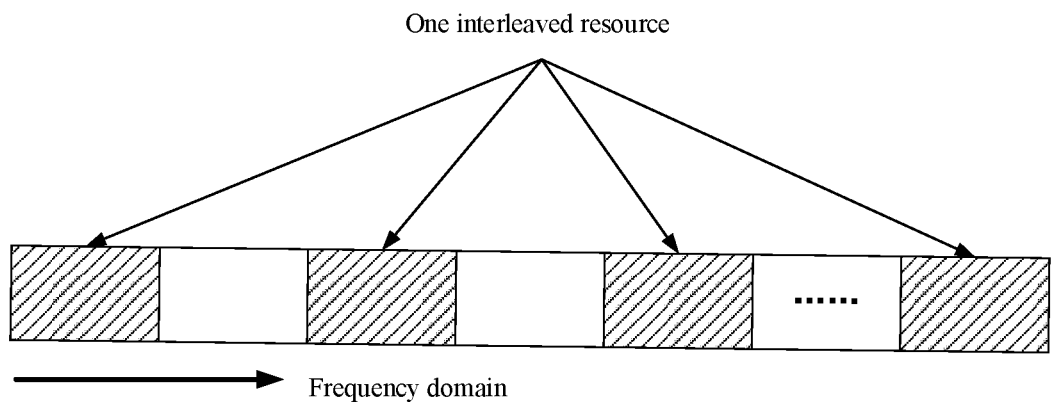
FIG. 8 is a schematic diagram of an interleaved resource.

In some embodiments, one interleaved resource consists of F PRBs. The value of F and positions in frequency domain of the F PRBs may be configured by the base station, configured by the CH, pre-configured or defined by the standard. For example, the F PRBs in one interleaved resource may include F PRBs with a starting point off and an interval of k, where $0 \le f < k$, F is a maximum integer which ensures $f+F*k$ is not greater than W, and W is the channel bandwidth. The value of k may be configured by the base station, configured by the CH, pre-configured or defined by the standard. The value of k may be related to a Sub-Carrier Space (SCS). That is, different Sub-Carrier Spaces correspond to different k values. For example, the value of k may be floor(W/3), ceil(W*0.8), 5, 10, or other values, where floor(•) represents a rounding down operation, and ceil(•) represents a rounding up operation. In a case where the channel bandwidth W is greater than 5, the value of k may be 5. In a case where the channel bandwidth W is greater than 10, the value of k may be 10. An example of an interleaved resource is given in FIG. 8, where the value of k is equal to 2. If f is 1 and the channel bandwidth W includes 10 PRBs, the interleaved resource includes PRBs with indexes of 1, 3, 5, 7, and 9.

In some embodiments, N1 consecutive OFDM symbols starting from OFDM symbol n1 within one slot are used for PSCCH. For example, assuming that the OFDM symbols in one slot start from 0 (that is, the index is 0), n1 may be equal to 0 or 1, N1<N (the total number of OFDM symbols in one slot). The specific value of N1 may be configured by the base station, configured by the CH, pre-configured or defined by the standard. In some embodiments, if the RX does not need to perform AGC adjustment when receiving the current slot, for example, when the current slot only allows the CH to send the PSCCH and/or the PSSCH, then in this case, n1=0; otherwise, n1=1.

In some embodiments, in frequency domain, one PSCCH occupies M1 or M2 interleaved resources. In this example, M1 or M2 may be determined in the following ways 1-1, 1-2, and 1-3.

In the way 1-1, a value of M1 is the same as the number of interleaved resources occupied by the PSSCH scheduled by the PSCCH.

In the way 1-2, M2 has only one allowable value in the resource pool. For example, M2=1. Alternatively, the value of M2 may be configured by the base station, configured by the CH, pre-configured or defined by the standard.

In the way 1-3, M2 has a plurality of optional values in the resource pool. For example, M2=1 or 2. The optional values of M2 in the resource pool may be configured by the base station, configured by the CH, pre-configured or defined by the standard.

In some embodiments, when the PSSCH scheduled by the PSCCH is located in the current slot, the value of M1 is determined in the way 1-1. In this case, a starting point of the M1 interleaved resources is the same as a starting point of the interleaved resources occupied by the PSSCH scheduled by the PSCCH. If the PSCCH does not schedule the PSSCH, or the PSSCHs scheduled by the PSCCH are located in different slots, the value of M2 is determined in the way 1-2 or in the way 1-3. The above-mentioned values of M1 and M2 may be the same or different.

In some embodiments, if the PSCCH starts from an OFDM symbol with an index of 1, an OFDM symbol with an index of 0 is used for sending the PSSCH, or used for repeatedly sending the PSCCH on the OFDM symbol with the index of 1. In this case, the channel sent on the OFDM symbol with the index of 0 may be regarded as redundant information, and whether the RX successfully receives the redundant information has no effect on the transmission of the sidelink signal.

In some embodiments, a transmit power of TX on the OFDM symbol used for sending the PSCCH in one slot is the same as a transmit power of TX on the OFDM symbol used for sending the PSSCH in one slot.

Figure 9:
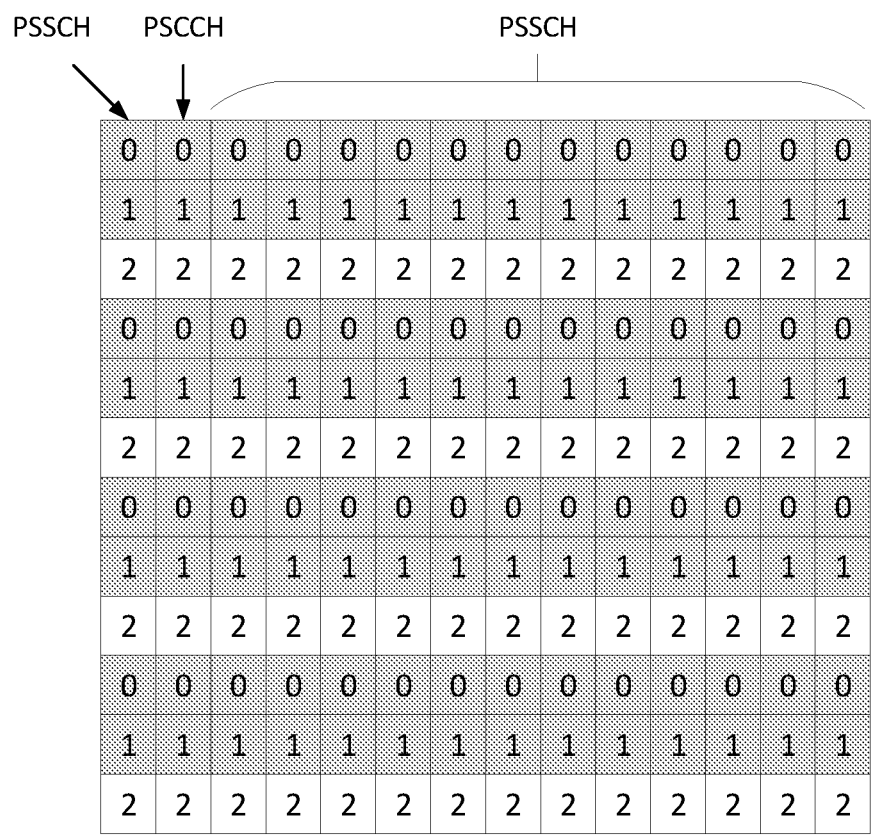
FIG. 9 is a schematic diagram of a time division multiplexing option for a PSCCH and a PSSCH.

FIG. 9 shows an example of a time division multiplexing method for a PSCCH and a PSSCH, where the horizontal axis represents time, and the vertical axis represents frequency. PRBs with the same digital identity represent one interleaved resource, and there are a total of three interleaved resources within the bandwidth range. The PSCCH is located in a first OFDM symbol, and other OFDM symbols are used for the PSSCH. In this example, the PSCCH occupies two consecutive interleaved resources 0 and 1, and the PSSCHs scheduled by the PSCCH are located in the same slot and occupy the same interleaved resource.

This time division multiplexing method allows the PSCCH to be sent earlier than the PSSCH, which is beneficial for the Receiver to perform PSCCH decoding in advance and to perform PSSCH demodulation according to the PSCCH decoding result, thereby being beneficial to reduce the PSSCH demodulation delay.

Example 2

The PSCCH and the PSSCH are multiplexed by means of frequency division. The PSCCH occupies a specific interleaved resource in one slot, or occupies a specific PRB in one interleaved resource, or occupies a specific PRB in the resource pool.

In this example, for the meaning of the interleaved resource, reference may be made to the related description in Example 1, which is not repeated here. The abovementioned resource pool may include a plurality of interleaved resources.

In some embodiments, N3 consecutive OFDM symbols starting from OFDM symbol n3 within one slot are used for the PSCCH. For example, assuming that the OFDM symbol within one slot starts from 0, then n3=0. Assuming that the (N-1)-th OFDM symbol is used for the guard period (Gap), then N3=N-2; otherwise, N3=N-1.

In a possible implementation, one PSCCH occupies M3 interleaved resources in frequency domain. For example, M3 may be determined in the following two ways 2-1 and 2-2.

In the way 2-1, M3 has only one allowable value in the resource pool. For example, M3=1. Alternatively, the value of M3 may be configured by the base station, configured by the CH, pre-configured or defined by the standard.

In the way 2-2, M3 has a plurality of optional values in the resource pool. For example, M3=1 or 2. The optional values of M3 in the resource pool may be configured by the base station, configured by the CH, pre-configured or defined by the standard.

Figure 10:
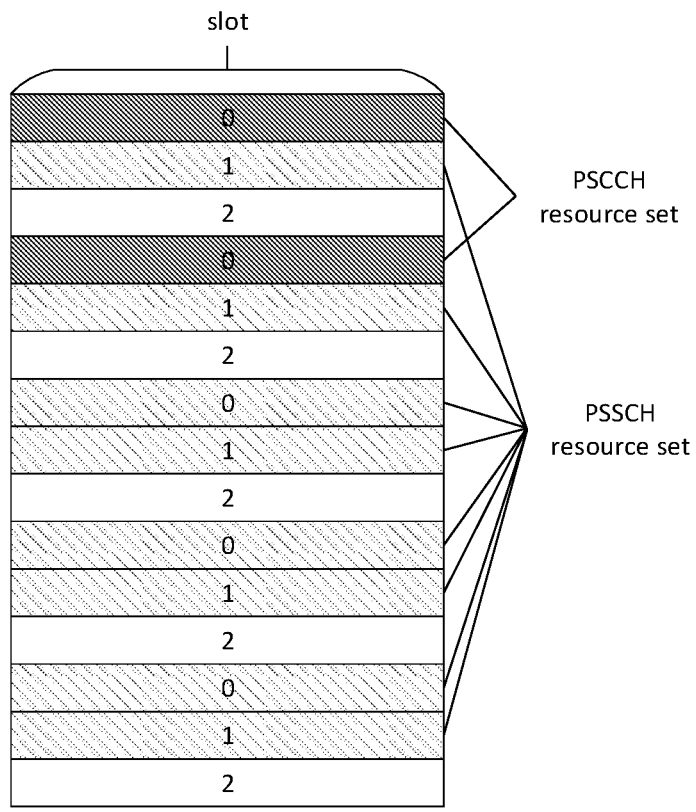
FIG. 10 is a schematic diagram of a PSCCH occupying a plurality of PRBs in one interleaved resource.

In another possible implementation, the PSCCH occupies first M3_PRB PRBs of one interleaved resource. The value of M3_PRB may be configured by the base station, configured by the CH, pre-configured or defined by the standard. In this implementation, if the PSCCH occupies a plurality of interleaved resources, the starting points in frequency domain of the plurality of interleaved resources should be adjacent. In this case, optionally, the PSCCH is only sent on the first M3_PRB PRBs of the first interleaved resource occupied by the PSSCH. As shown in FIG. 10, the PSCCH occupies the first two PRBs of interleaved resource 0, and the PSSCH scheduled by the PSCCH occupies other PRBs in interleaved resource 0 and all PRBs in interleaved resource 1.

Figure 11:
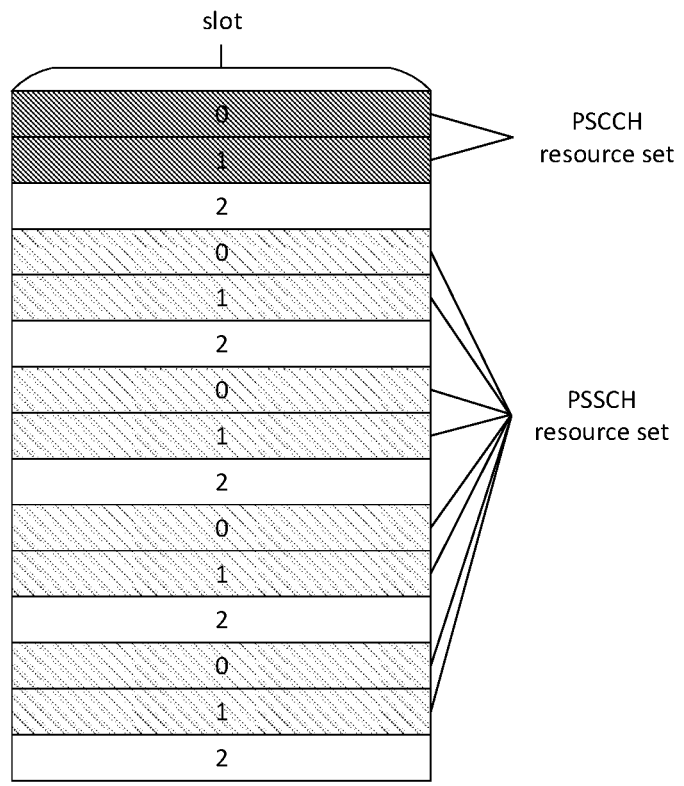
FIG. 11 is a schematic diagram of a PSCCH occupying the first PRBs of two consecutive interleaved resources.

In the above implementation, optionally, the PSCCH occupies the first a PRBs of the first A interleaved resources occupied by the PSSCH. In this case, in the current resource pool, the minimum resource granularity of the PSSCH should be A interleaved resources. Values of A and a may be configured by the base station, configured by the CH, pre-configured or defined by the standard. Compared with a solution in which discontinuous PRBs are used for sending the PSCCH, this solution is in consecutive PRBs in a PSCCH set. This is beneficial to reduce In-band Emission (IBE) interferences caused by other terminals. The IBE interferences are coming from signals sent by other terminals on adjacent PRBs. There may be IBE interferences in discontinuous PRBs as well. FIG. 11 shows an example in which PSSCH occupies two interleaved resources 0 and 1 with consecutive starting points, and PSCCH occupies the first PRBs of interleaved resource 0 and interleaved resource 1.

In another possible implementation, frequency domain resources in the resource pool are divided into two parts, one of which is a PSCCH resource set. The PSCCH resource set includes at least one PSCCH resource. The PSCCH resource consists of a specific number of PRBs. In some embodiments, the PSCCH resource set consists of one or more consecutive PRBs. One PSCCH resource consists of one or more consecutive PRBs. The PSCCH resource set and the number of PRBs included in the PSCCH resource set may be configured by the base station, configured by the CH, pre-configured or defined by the standard. The other part is a PSSCH resource set. In some embodiments, the PSSCH resource set consists of one or more interleaved resources. The number of interleaved resources in the PSSCH resource set is the same as the number of PSCCH resources in the PSCCH resource set. In some embodiments, a starting point in frequency domain of the PSSCH scheduled by the PSCCH sent on an i-th PSCCH resource in the PSCCH resource set is a starting point of an i-th interlaced resource in the PSCCH resource set, where i is 0 or a positive integer.

Figure 12:
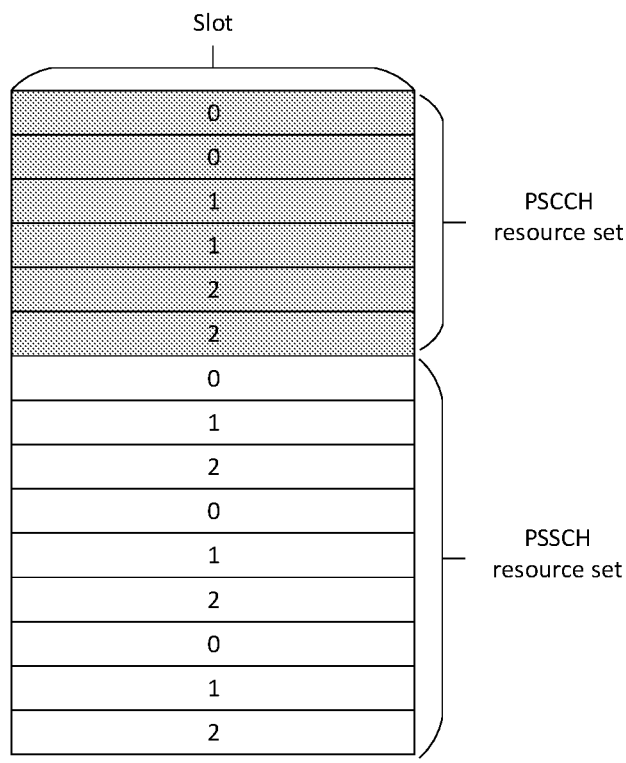
FIG. 12 is a schematic diagram of a PSCCH resource set and a PSSCH resource set.

For example, FIG. 12 is a schematic diagram of a PSCCH resource set and a PSSCH resource set. Each PSCCH resource includes two PRBs, and the PSCCH resource set in the resource pool includes three PSCCH resources. Accordingly, the PSSCH resource set in the resource pool includes three interleaved resources. In this case, the PSCCH resource set does not include the interleaved resource, and the PSSCH resource set includes a plurality of interleaved resources.

Example 3

The PSCCH and the PSSCH are multiplexed with the PSSCH by means of frequency division on part of the OFDM symbols that can be used for the sidelink communication in one slot. On the part of the OFDM symbols, the PSCCH may occupy a specific interleaved resource, a specific PRB of the interleaved resource, or a specific PRB in the resource pool.

In this example, for the meaning of the interleaved resource, reference may be made to the related description in Example 1, which is not repeated here.

In some embodiments, N4 consecutive OFDM symbols starting from OFDM symbol n4 within one slot are used for the PSCCH, which are referred to as PSCCH symbols hereinafter. For example, assuming that OFDM symbols within one slot start from 0, n4 may be equal to 0 or 1, N4<N, and the specific value of N1 may be configured by the base station, configured by the CH, pre-configured or defined by the standard. In some embodiments, if the RX does not need to perform AGC adjustment when receiving the current slot, for example, when the current slot only allows the CH to send the PSCCH and/or the PSSCH, in this case, n4=0; otherwise, n4=1.

In some embodiments, if the PSCCH starts from an OFDM symbol with an index of 1, an OFDM symbol with an index of 0 is used for sending the PSSCH, or used for repeatedly sending the PSCCH on the OFDM symbol with the index of 1.

In some embodiments, if the PSCCH and the scheduled PSSCH are sent in the same slot, frequency domain resources occupied by one TX are the same on a PSCCH symbol and on a symbol where only the PSSCH exists. If S4 interleaved resources are occupied by the TX on the symbol where only the PSSCH exists, the S4 interleaved resources are a superset in frequency domain of M4 interleaved resources used by the TX for sending the PSCCH. On the PSCCH symbol, the TX sends the PSSCH on an interleaved resource not used for sending the PSCCH among the S4 interleaved resources.

In a possible implementation, one PSCCH occupies M4 interleaved resources within the PSCCH symbol in frequency domain. For example, M4 may be determined in the following ways 3-1 and 3-2.

In the way 3-1, M4 has only one allowable value in the resource pool. For example, M4=1. Alternatively, the value of M4 may be configured by the base station, configured by the CH, pre-configured or defined by the standard.

In the way 3-2, M4 has a plurality of optional values in the resource pool. For example, M4=1 or 2. The optional values of M4 in the resource pool may be configured by the base station, configured by the CH, pre-configured or defined by the standard.

Figure 13:
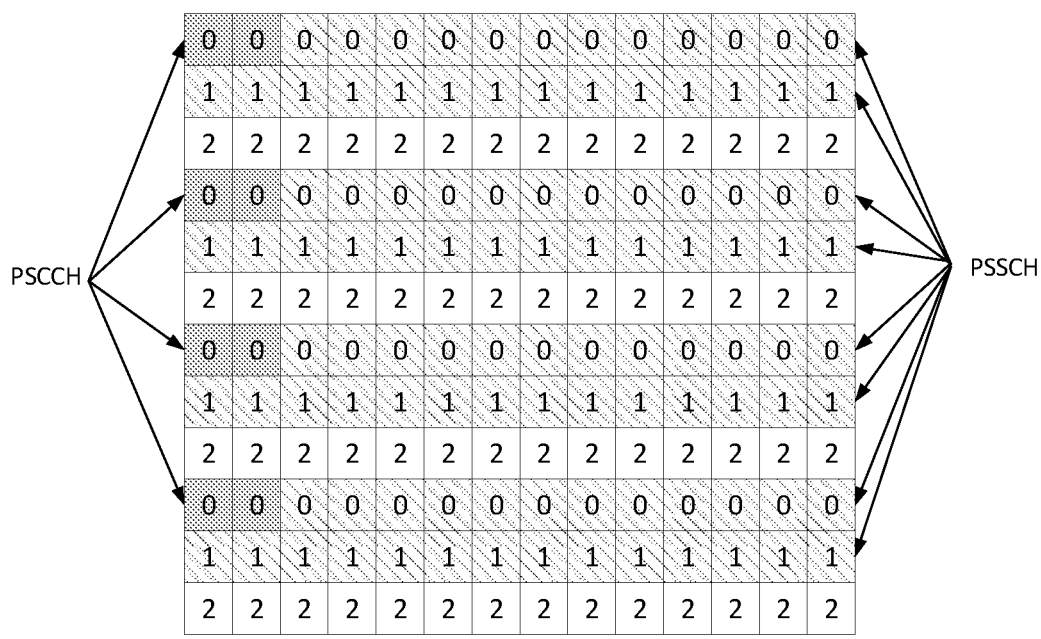
FIG. 13 is a schematic diagram of a PSCCH and a PSSCH occupying different interleaved resources.

For example, FIG. 13 is a schematic diagram of a PSCCH and a PSSCH occupying different interleaved resources, where the horizontal axis represents time, and the vertical axis represents frequency. PSCCH symbols include symbol 0 and symbol 1. PSCCH occupies one interleaved resource, i.e., interleaved resource 0. PSSCH scheduled by PSCCH occupies two interleaved resources, i.e., interleaved resource 0 and interleaved resource 1. On the PSCCH symbol, interleaved resource 0 is used for sending PSCCH, and interleaved resource 1 is used for sending PSSCH. On the symbol where only the PSCCH exists, interleaved resource 0 (PRBs other than the first two PRBs used for sending the PSCCH) and interleaved resource 1 (all PRBs) are used for sending the PSSCH.

In another possible implementation, the PSCCH occupies the first M4_PRB PRBs of one interleaved resource in frequency domain. The value of M4_PRB may be configured by the base station, configured by the CH, pre-configured or defined by the standard. In this implementation, if the PSSCH occupies a plurality of interleaved resources, the starting points in frequency domain of the plurality of interleaved resources should be adjacent. In this case, optionally, the PSCCH is only sent on the first M3_PRB PRBs of the first interleaved resource occupied by the PSSCH. In some embodiments, the PSCCH occupies the first a PRBs of the first A interleaved resources occupied by the PSSCH. In this case, in the current resource pool, the minimum resource granularity of the PSSCH should be A interleaved resources. Values of A and a may be configured by the base station, configured by the CH, pre-configured or defined by the standard.

In a possible implementation, frequency domain resources in the resource pool are divided into two parts, one of which is a PSCCH resource set and is only located within the PSCCH symbol. The PSCCH resource set includes at least one PSCCH resource, and the PSCCH resource consists of a specific number of PRBs. In some embodiments, the PSCCH resource set consists of one or more consecutive PRBs, and one PSCCH resource consists of one or more consecutive PRBs. The PSCCH resource set and the number of PRBs included in the PSCCH resource set may be configured by the base station, configured by the CH, pre-configured or defined by the standard. The other part is a PSSCH resource set. In some embodiments, the PSSCH resource set consists of one or more interleaved resources, and the number of interleaved resources in the PSSCH resource set is the same as the number of PSCCH resources in the PSCCH resource set. In some embodiments, a starting point in frequency domain of the PSSCH scheduled by the PSCCH sent on an i-th PSCCH resource in the PSCCH resource set is an i-th PSSCH.

In some embodiments, a transmit power of TX on the OFDM symbol with only the PSCCH transmission in one slot is the same as a transmit power of TX on the OFDM symbol with only the PSSCH transmission in one slot.

Example 4

The PSCCH and the PSSCH are multiplexed by means of time division in the same slot. The PSCCH occupies one or more PRBs. The one or more TXs ensure that the channel bandwidth occupied by the OFDM symbol where the PSCCH is located is not less than the specific proportion of the channel bandwidth.

In some embodiments, N2 consecutive OFDM symbols starting from OFDM symbol n2 within one slot are used for the PSCCH. For example, assuming that the OFDM symbols within one slot start from 0, n2 may be equal to 0 or 1, N2<N, and the specific value of N2 may be configured by the base station, configured by the CH, pre-configured or defined by the standard. In some embodiments, if the RX does not need to perform AGC adjustment when receiving the current slot, for example, when the current slot only allows the CH to send the PSCCH and/or the PSSCH, then in this case, n2=0; otherwise, n2=1.

In some embodiments, one PSCCH occupies M5 PRBs in frequency domain, and M5 may be determined in the following two ways 4-1 and 4-2.

In the way 4-1, M5 has only one allowable value in the resource pool. For example, M5=1. Alternatively, the value of M5 may be configured by the base station, configured by the CH, pre-configured or defined by the standard.

In the way 4-2, M5 has a plurality of optional values in the resource pool. For example, M5=1 or 2. The optional values of M5 in the resource pool may be configured by the base station, configured by the CH, pre-configured or defined by the standard.

In some embodiments, in the above two ways, if one TX is scheduled by the base station or the CH, the value of M5 adopted by the TX may be dynamically indicated by the base station or the CH. If the TX is the CH, the value of M5 may be selected by the CH. If the channel bandwidth occupied by the PSCCH sent by the CH is less than a specific proportion, for example 80%, of the total channel bandwidth, the CH may send partial padding information to ensure that a condition of the above-mentioned specific proportion is satisfied.

In the above two ways, if the value of M5 is greater than 1, the M5 PRBs may be consecutive or discrete in frequency domain.

The above various examples of the present disclosure include a plurality of multiplexing methods for the PSCCH and the PSSCH.

For example, the PSCCH and the PSSCH may occupy different OFDM symbols, and occupy different interleaved resources on different OFDM symbols. Or, the TX terminal ensures bandwidth occupancy rates on different OFDM symbols (TX may flexibly decide how many PRBs to send, where to send the PRB, etc.).

For another example, the PSCCH and the PSSCH occupy the same OFDM symbol, but occupy different interleaved resources in frequency domain, or occupy different PRBs of the same interleaved resource, or occupy different frequency domain resource sets.

For another example, the PSCCH and the PSSCH are multiplexed by means of frequency division on some OFDM symbols in one slot. On these OFDM symbols, the PSCCH and the PSSCH may occupy different interleaved resources, or different PRBs of the same interleaved resource, or different frequency domain resource sets.

Through the above method, it may be ensured that in the unlicensed frequency band, the frequency domain bandwidth in frequency domain occupied by the PSCCH and the PSSCH sent by the same TX may reach a certain proportion of the total channel bandwidth, so that the sidelink communication can operate normally in the unlicensed frequency band, thereby reducing interferences between sidelink signals.

Figure 14:
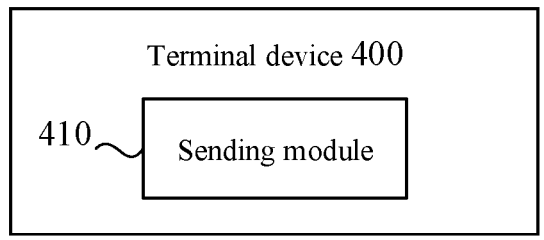
FIG. 14 is a schematic block diagram of a terminal device according to an embodiment of the present disclosure.

FIG. 14 is a schematic block diagram of a terminal device 400 according to an embodiment of the present disclosure. The terminal device 400 may be a transmitter (TX), and the terminal device 400 may include a sending module 410.

The sending module 410 is configured to send a sidelink signal occupying an interleaved resource. One interleaved resource includes a plurality of Physical Resource Blocks (PRBs) with a specific interval in frequency domain, and a frequency domain bandwidth occupied by one interleaved resource is not less than a specific proportion of a channel bandwidth.

In some embodiments of the present disclosure, one interleaved resource includes F PRBs with a starting point off and an interval of k PRBs, where $0 \leq f < k$, and F is a maximum integer rendering $f+F*k$ to be not greater than the channel bandwidth W.

In some embodiments of the present disclosure, the value of k corresponds to a Sub-Carrier Space (SCS).

In some embodiments of the present disclosure, the sidelink signal includes a Physical Sidelink Control Channel (PSCCH) and a Physical Sidelink Shared Channel (PSSCH).

In some embodiments of the present disclosure, N consecutive Orthogonal Frequency Division Multiplexing (OFDM) symbols starting from an n-th OFDM symbol within one slot are used for the PSCCH.

If a Receiver (RX) does not need to perform Automatic Gain Control (AGC), n=0; otherwise, n=1, where N is a positive integer.

In some embodiments of the present disclosure, if the PSCCH is sent starting from an OFDM symbol with an index of 1, an OFDM symbol with an index of 0 is used for sending the PSSCH, or used for repeatedly sending the same PSCCH as the PSCCH on the OFDM symbol with the index of 1.

In some embodiments of the present disclosure, the PSCCH and the PSSCH are multiplexed by means of time division in the same slot.

In some embodiments of the present disclosure, the PSCCH occupies at least one interlaced resource.

In some embodiments of the present disclosure, the PSCCH occupies M1 interleaved resources. If a PSSCH scheduled by the PSCCH is located in a current slot, M1 is the same as the number of interleaved resources occupied by the PSSCH scheduled by the PSCCH. The current slot is a slot where the PSCCH is located, and M1 is a positive integer.

In some embodiments of the present disclosure, the PSCCH occupies M2 interlaced resources. If the PSCCH does not schedule the PSSCH, or a PSSCH scheduled by the PSCCH is located in a different slot than the PSCCH, M2 has one allowable value or a plurality of optional values in a resource pool, where M2 is a positive integer.

In some embodiments of the present disclosure, OFDM symbols within the slot other than the OFDM symbol used for the PSCCH are used for the PSSCH scheduled by the PSCCH.

In some embodiments of the present disclosure, the PSCCH occupies at least one PRB of one interlaced resource.

In some embodiments of the present disclosure, a PSSCH scheduled by the PSCCH occupies PRBs in the interleaved resource other than the PRB occupied by the PSCCH.

In some embodiments of the present disclosure, the PSCCH and the PSSCH are multiplexed by means of frequency division.

In some embodiments of the present disclosure, the PSCCH occupies at least one interleaved resource within one slot.

In some embodiments of the present disclosure, the PSCCH occupies M3 interleaved resources within one slot. M3 has one allowable value or a plurality of optional values in a resource pool, and M3 is a positive integer.

In some embodiments of the present disclosure, the PSCCH occupies at least one PRB of one interlaced resource within one slot.

In some embodiments of the present disclosure, if a PSSCH scheduled by the PSCCH occupies a plurality of interleaved resources, starting points in frequency domain of the plurality of interleaved resources occupied by the PSSCH are adjacent.

In some embodiments of the present disclosure, the PSCCH is sent on a specific number of PRBs starting from the first interlaced resource occupied by the PSSCH.

In some embodiments of the present disclosure, the PSCCH occupies the first a PRBs of the first A interleaved resources occupied by the PSSCH, where A and a are positive integers.

In some embodiments of the present disclosure, the PSCCH occupies at least one PRB in a resource pool including at least one interleaved resource.

In some embodiments of the present disclosure, the resource pool includes a PSCCH resource set and a PSSCH resource set.

In some embodiments of the present disclosure, the PSCCH resource set includes at least one PSCCH resource, and one PSCCH resource consists of one PRB or a plurality of consecutive PRBs.

In some embodiments of the present disclosure, the number of interleaved resources in the PSSCH resource set is the same as the number of PSCCH resources in the PSCCH resource set.

In some embodiments of the present disclosure, a starting point in frequency domain of a PSSCH scheduled by the PSCCH sent on an i-th PSCCH resource in the PSCCH resource set is a starting point of an i-th interlaced resource in the PSCCH resource set, where i is 0 or a positive integer.

In some embodiments of the present disclosure, the PSCCH is multiplexed with the PSSCH by means of frequency division on part of the OFDM symbols available for sidelink communication in one slot.

In some embodiments of the present disclosure, the PSCCH occupies at least one interleaved resource on the part of the OFDM symbols.

In some embodiments of the present disclosure, the PSCCH occupies at least one PRB of one interleaved resource on the part of the OFDM symbols.

In some embodiments of the present disclosure, if the PSCCH and a PSSCH scheduled by the PSCCH are sent in the same slot, frequency domain resources occupied by one TX are the same on a PSCCH symbol and on a symbol where only the PSSCH exists. The PSCCH symbol includes a plurality of consecutive OFDM symbols for sending the PSCCH.

In some embodiments of the present disclosure, if S4 interleaved resources are occupied by one TX on the symbol where only the PSSCH exists, the S4 interleaved resources are a superset in frequency domain of M4 interleaved resources used by the TX for sending the PSCCH.

In some embodiments of the present disclosure, the PSSCH scheduled by the PSCCH is sent by the sending module 410 on an interlaced resource not used for sending the PSCCH among the S4 interlaced resources on the PSCCH symbol.

In some embodiments of the present disclosure, M4 has one allowable value or a plurality of optional values in a resource pool.

The terminal device 400 in embodiments of the present disclosure can implement corresponding functions of the terminal device in the foregoing embodiments about the method 200 and the foregoing Example 1, Example 2, and Example 3. For processes, functions, implementations, and beneficial effects corresponding to individual modules (sub-modules, units, or components, etc.) in the terminal device 400, reference may be made to the corresponding descriptions in the foregoing method embodiments, which will not be repeated here.

It should be noted that the described functions of individual modules (sub-modules, units, or components, etc.) in the terminal device 400 according to embodiments of the present disclosure may be implemented by different modules (sub-modules, units, or components, etc.), or may be implemented by the same module (sub-module, unit, or component, etc.).

Figure 15:
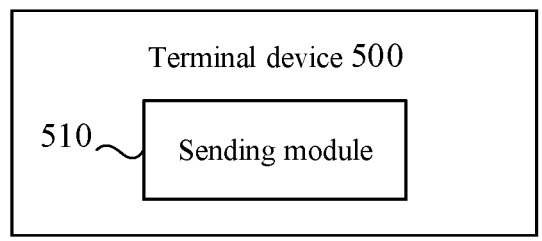
FIG. 15 is a schematic block diagram of a network device according to an embodiment of the present disclosure.

FIG. 15 is a schematic block diagram of a terminal device 500 according to an embodiment of the present disclosure. The terminal device 500 may be a transmitter (TX), and the terminal device 500 may include a sending module 510.

The sending module 510 is configured to send a PSCCH and a PSSCH. The PSCCH and the PSSCH are multiplexed by means of time division within one slot. The PSCCH occupies at least one PRB. The frequency domain bandwidth occupied by the OFDM symbol where the PSCCH is located is controlled by one or more TXs to be not less than a specific proportion of a channel bandwidth.

In some embodiments of the present disclosure, N consecutive OFDM symbols starting from the n-th OFDM symbol in one slot are used for PSCCH. If the receiver (RX) does not need to perform automatic gain control (AGC), then n=0; otherwise, n=1, where N is a positive integer. The value of N may be configured or pre-configured by the base station or the CH, or defined by the standard.

In some embodiments of the present disclosure, one PSCCH occupies M5 PRBs, where M5 is a positive integer.

In some embodiments of the present disclosure, M5 has one allowable value or a plurality of optional values in a resource pool.

In some embodiments, the allowable value or the plurality of optional values of M5 may be configured or pre-configured by a base station or a Cluster Header (CH), or defined by a standard.

In some embodiments of the present disclosure, if one TX is scheduled by the base station or the CH, the value of M5 adopted by the TX may be dynamically indicated by the base station or the CH.

In some embodiments of the present disclosure, if the TX is the CH, M5 is selected by the CH.

In some embodiments of the present disclosure, if the TX is the CH, the sending module is further configured to send redundant information, so as to control the frequency domain bandwidth occupied by the OFDM symbol where the PSCCH is located to be not less than the specific proportion of the channel bandwidth.

In some embodiments of the present disclosure, if M5 is greater than 1, the M5 PRBs are consecutive or discrete in frequency domain.

The terminal device 500 in embodiments of the present disclosure can implement corresponding functions of the Transmitter in the foregoing embodiments of the method 300 and the foregoing Example 4. For processes, functions, implementations, and beneficial effects corresponding to individual modules (sub-modules, units, or components, etc.) in the terminal device 400, reference may be made to the corresponding descriptions in the foregoing method embodiments, which will not be repeated here.

It should be noted that the described functions of individual modules (sub-modules, units, or components, etc.) in the terminal device 500 according to embodiments of the present disclosure may be implemented by different modules (sub-modules, units, or components, etc.), or may be implemented by the same module (sub-module, unit, or component, etc.).

Figure 16:
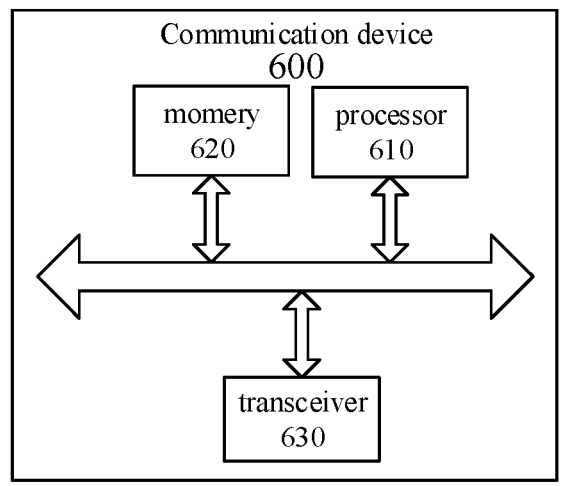
FIG. 16 is a schematic block diagram of a communication device according to an embodiment of the present disclosure.

FIG. 16 is a schematic structural diagram of a communication device 600 according to an embodiment of the present disclosure. The communication device 600 includes a processor 610. The processor 610 may call a computer program from a memory and run the computer program, so that the communication device 600 is caused to implement the method in embodiments of the present disclosure.

In some embodiments, as shown in FIG. 16, the communication device 600 may further include a memory 620. The processor 610 may call the computer program from the memory 620 and run the computer program, so that the communication device 600 is caused to implement the method in embodiments of the present disclosure.

The memory 620 may be a separate component independent of the processor 610, or may be integrated into the processor 610.

In some embodiments, as shown in FIG. 16, the communication device 600 may further include a transceiver 630. The processor 610 may control the transceiver 630 to communicate with another device. Specifically, the transceiver 630 may transmit information or data to another device, or receive information or data transmitted by another device.

The transceiver 630 may include a transmitter and a receiver. The transceiver 630 may further include an antenna. There may be one or more antennas.

In some embodiments, the communication device 600 may be the network device in embodiments of the present disclosure. The communication device 600 may implement respective procedures performed by the network device in various methods according to embodiments of the present disclosure. For brevity, details are not described herein again.

In some embodiments, the communication device 600 may be the terminal device in embodiments of the present disclosure. The communication device 600 may implement respective procedures performed by the terminal device in various methods according to embodiments of the present disclosure. For brevity, details are not described herein again.

Figure 17:
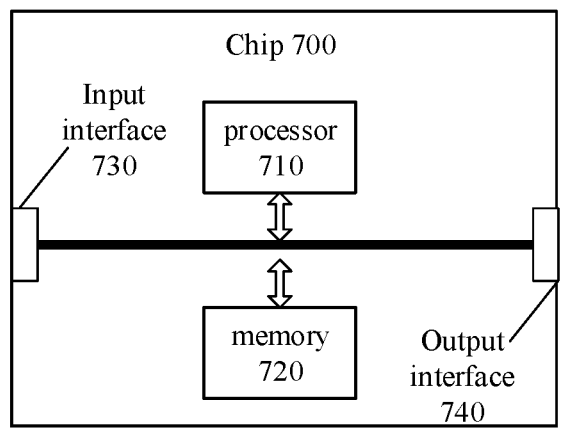
FIG. 17 is a schematic block diagram of a chip according to an embodiment of the present disclosure.

FIG. 17 is a schematic structural diagram of a chip 700 according to an embodiment of the present disclosure. The chip 700 includes a processor 710 which can call and run a computer program from a memory to implement the method according to embodiments of the present disclosure.

In some embodiments, as shown in FIG. 17, the chip 700 may further include a memory 720. The processor 710 can call and run the computer program from the memory 720 to carry out the method performed by the terminal device or the network device in embodiments of the present disclosure.

The memory 720 may be a separate device independent of the processor 710, or may be integrated in the processor 710.

In some embodiments, the chip 700 may further include an input interface 730. The processor 710 may control the input interface 730 to communicate with other devices or chips, and specifically, to acquire information or data transmitted by other devices or chips.

In some embodiments, the chip 700 may further include an output interface 740. The processor 710 may control the output interface 740 to communicate with other devices or chips, and specifically, to output information or data to other devices or chips.

In some embodiments, the chip may be applied to the network device in embodiments of the present disclosure. The chip may implement respective procedures performed by the network device in various methods according to embodiments of the present disclosure. For brevity, details are not described herein again.

In some embodiments, the chip may be applied to the terminal device in embodiments of the present disclosure. The chip may implement respective procedures performed by the terminal device in various methods according to embodiments of the present disclosure. For brevity, details are not described herein again.

The chips applied to the network device and the terminal device may be the same chip or different chips.

It should be understood that the chip mentioned in embodiments of the present disclosure may also be referred to as a system-level chip, a system chip, a chip system, or a system-on-chip.

The processor mentioned above may be a universal processor, a Digital Signal Processor (DSP), a Field Programmable Gate Array (FPGA), an Application Specific Integrated Circuit (ASIC), or other programmable logical device, a transistor logical device, a discrete hardware component or the like. The universal processor mentioned above may be a microprocessor, or may also be any conventional processor and the like.

The memory mentioned above may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM).

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in embodiments of the present disclosure is intended to include but is not limited to those and any other suitable types of memories.

Figure 18:
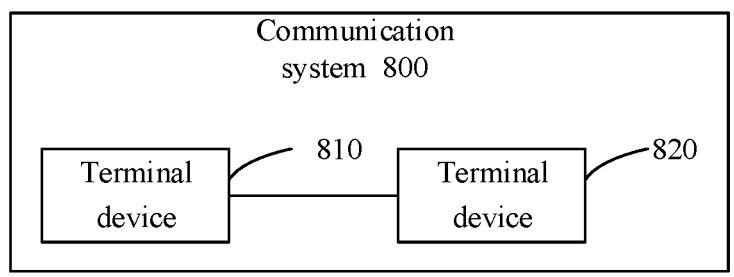
FIG. 18 is a schematic block diagram of a communication system according to an embodiment of the present disclosure.

FIG. 18 is a schematic block diagram of a communication system 800 according to an embodiment of the present disclosure. The communication system 800 includes a terminal device 810 and a terminal device 820. The terminal device 810 may be a Transmitter (TX) terminal, and the terminal device 820 may be a Receiver (RX) terminal.

In an implementation, a sidelink signal sent by the terminal device 810 occupies an interleaved resource. One interleaved resource includes a plurality of Physical Resource Blocks (PRBs) with a specific interval in frequency domain. A frequency domain bandwidth occupied by one interleaved resource is not less than a specific proportion of a channel bandwidth.

In an implementation, a PSCCH and a PSSCH sent by the terminal device 810 are multiplexed by means of time division within one slot. The PSCCH occupies at least one PRB. The frequency domain bandwidth occupied by the OFDM symbol where the PSCCH is located is controlled by one or more TXs to be not less than a specific proportion of a channel bandwidth.

The terminal device 810 may be configured to implement corresponding functions implemented by the transmitter (TX) in the above method. The content in this embodiment that is the same as that described in the foregoing embodiments has the same meaning, for example with respect to the sidelink signal, the interleaved resource, etc. Reference may be made to the relevant description of the foregoing embodiments. For brevity, details are not repeated here.

The above-mentioned embodiments may be all or partially implemented by hardware, software, firmware, or any combination thereof. When being implemented by software, the functions may be all or partially implemented in form of computer program products. The computer program products include one or more computer instructions. When the computer program instructions are loaded and performed on a computer, the processes or functions described according to embodiments of the present disclosure are generated in whole or in part. The computer may be a general-purpose computer, a special-purpose computer, a computer network, or other programmable device. The computer instructions may be stored in a computer-readable storage medium or transferred from one computer-readable storage medium to another computer-readable storage medium. For example, the computer instructions may be transferred from a website site, a computer, a server or a data center to another website site, computer, server, or data center by wire (e.g., coaxial cable, fiber optic, Digital Subscriber Line (DSL)) or in a wireless way (e.g., infrared, wireless, microwave, etc.). The computer-readable storage medium may be any available medium that can be accessed by a computer or a data storage device such as a server, a data center, or the like that includes one or more available mediums. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), etc.

It should be understood that sequence numbers of the foregoing processes do not mean execution sequences in various method embodiments of the present disclosure. The execution sequences of these processes may be determined according to functions and internal logic of these processes, and should not be construed as any limitation on the implementation processes of embodiments of the present disclosure.

It may be clearly understood by a person skilled in the art that, for the purpose of convenient and brief description, with respect to a detailed working process of the system, apparatus, and unit, reference may be made to a corresponding process in the foregoing method embodiments. Details are not described herein again.

The foregoing descriptions are merely specific embodiments of the present disclosure, but the protection scope of the present disclosure is not limited thereto. Any person skilled in the art can easily think of changes or substitutions within the technical scope disclosed by the present disclosure. Therefore, the protection scope of the present disclosure should be defied by the appended claims.

What is claimed is:

1. A sidelink communication method, comprising:
    sending, by a Transmitter (TX), a sidelink signal occupying an interleaved resource, wherein one interleaved resource comprises a plurality of Physical Resource Blocks (PRBs) with a specific interval in frequency domain, and a frequency domain bandwidth occupied by one interleaved resource is not less than a specific proportion of a channel bandwidth, wherein
    one interleaved resource comprises F PRBs with a starting point of f and an interval of k PRBs, where $0 \le f < k$, and F is a maximum integer rendering f+F*k to be not greater than the channel bandwidth W; and
    a value of k corresponds to a Sub-Carrier Space (SCS).

2. The method according to claim 1, wherein the sidelink signal comprises a Physical Sidelink Control Channel (PSCCH) and a Physical Sidelink Shared Channel (PSSCH).

3. The method according to claim 2, wherein
    N consecutive Orthogonal Frequency Division Multiplexing (OFDM) symbols starting from an n-th OFDM symbol within one slot are used for the PSCCH; and
    if a Receiver (RX) does not need to perform Automatic Gain Control (AGC), n=0; and otherwise, n=1, where N is a positive integer.

4. The method according to claim 2, wherein
    if the PSCCH is sent starting from an OFDM symbol with an index of 1, an OFDM symbol with an index of 0 is used for sending the PSSCH, or used for repeatedly sending the same PSCCH as the PSCCH on the OFDM symbol with the index of 1.

5. The method according to claim 2, wherein the PSCCH and the PSSCH are multiplexed by means of time division in the same slot.

6. The method according to claim 5, wherein the PSCCH occupies at least one interlaced resource.

7. The method according to claim 5, wherein the PSCCH occupies at least one PRB of one interlaced resource.

8. The method according to claim 2, wherein the PSCCH and the PSSCH are multiplexed by means of frequency division.

9. The method according to claim 8, wherein the PSCCH occupies at least one interleaved resource within one slot.

10. The method according to claim 8, wherein
    the PSCCH occupies at least one PRB in a resource pool comprising at least one interleaved resource.

11. The method according to claim 8, wherein the PSCCH is multiplexed with the PSSCH by means of frequency division on part of the OFDM symbols available for sidelink communication in one slot.

12. A terminal device, comprising: a processor and a memory, wherein the memory is configured to store a computer program, and the processor is configured to call and run the computer program stored in the memory, so that the terminal device is caused to perform a sidelink communication method, comprising:
    sending a sidelink signal occupying an interleaved resource, wherein one interleaved resource comprises a plurality of Physical Resource Blocks (PRBs) with a specific interval in frequency domain, and a frequency domain bandwidth occupied by one interleaved resource is not less than a specific proportion of a channel bandwidth; wherein
    one interleaved resource comprises F PRBs with a starting point of f and an interval of k PRBs, where $0 \le f < k$, and F is a maximum integer rendering f+F*k to be not greater than the channel bandwidth W; and
    a value of k corresponds to a Sub-Carrier Space (SCS).

13. The terminal device according to claim 12, wherein the sidelink signal comprises a Physical Sidelink Control Channel (PSCCH) and a Physical Sidelink Shared Channel (PSSCH).

14. The terminal device according to claim 13, wherein
    N consecutive Orthogonal Frequency Division Multiplexing (OFDM) symbols starting from an n-th OFDM symbol within one slot are used for the PSCCH; and
    if a Receiver (RX) does not need to perform Automatic Gain Control (AGC), n=0; and otherwise, n=1, where N is a positive integer.

15. The terminal device according to claim 13, wherein
    if the PSCCH is sent starting from an OFDM symbol with an index of 1, an OFDM symbol with an index of 0 is used for sending the PSSCH, or used for repeatedly sending the same PSCCH as the PSCCH on the OFDM symbol with the index of 1.

16. The terminal device according to claim 13, wherein the PSCCH and the PSSCH are multiplexed by means of time division in the same slot.

17. The terminal device according to claim 16, wherein the PSCCH occupies at least one interlaced resource.

18. The terminal device according to claim 16, wherein the PSCCH occupies at least one PRB of one interlaced resource.

19. The terminal device according to claim 13, wherein the PSCCH and the PSSCH are multiplexed by means of frequency division.

20. The terminal device according to claim 19, wherein the PSCCH occupies at least one interleaved resource within one slot.

* * * * *